(12) United States Patent
Krikorian

(10) Patent No.: US 8,904,455 B2
(45) Date of Patent: *Dec. 2, 2014

(54) PERSONAL VIDEO RECORDER FUNCTIONALITY FOR PLACESHIFTING SYSTEMS

(75) Inventor: Jason Gary Krikorian, Woodside, CA (US)

(73) Assignee: Sling Media Inc., Foster City, CA (US)

( * ) Notice: Subject to any disclaimer, the term of this patent is extended or adjusted under 35 U.S.C. 154(b) by 817 days.

This patent is subject to a terminal disclaimer.

(21) Appl. No.: 13/073,469

(22) Filed: Mar. 28, 2011

(65) Prior Publication Data

US 2011/0170842 A1 Jul. 14, 2011
US 2013/0272681 A9 Oct. 17, 2013

Related U.S. Application Data

(63) Continuation of application No. 11/933,969, filed on Nov. 1, 2007, now Pat. No. 7,917,932, which is a continuation-in-part of application No. 11/147,664, filed on Jun. 7, 2005, now Pat. No. 7,877,776.

(60) Provisional application No. 60/577,833, filed on Jun. 7, 2004.

(51) Int. Cl.

| H04N 7/173 | (2011.01) |
| H04N 5/765 | (2006.01) |
| H04L 29/06 | (2006.01) |
| H04N 19/40 | (2014.01) |
| H04N 5/14 | (2006.01) |
| H04L 12/28 | (2006.01) |
| H04N 5/85 | (2006.01) |

(52) U.S. Cl.
CPC ............ *H04L 12/2818* (2013.01); *H04N 5/765* (2013.01); *H04L 65/601* (2013.01); *H04N 19/00472* (2013.01); *H04L 2012/2849* (2013.01); *H04N 5/147* (2013.01); *H04L 65/4069* (2013.01); *H04N 5/85* (2013.01)
USPC ..................... 725/91; 725/93; 725/94; 725/95

(58) Field of Classification Search
USPC ................................................ 725/91, 93–95
See application file for complete search history.

(56) References Cited

U.S. PATENT DOCUMENTS

| 3,416,043 A | 12/1968 | Jorgensen |
| 4,254,303 A | 3/1981 | Takizawa |

(Continued)

FOREIGN PATENT DOCUMENTS

| CA | 2286641 A1 | 10/1998 |
| CA | 2324856 A1 | 5/2001 |

(Continued)

OTHER PUBLICATIONS

China State Intellectual Property Office "First Office Action," issued Jul. 31, 2009, for Application No. 200580026825.X.

(Continued)

*Primary Examiner* — Hunter B Lonsberry
(74) *Attorney, Agent, or Firm* — Ingrassia Fisher & Lorenz, P.C.

(57) ABSTRACT

PVR functionality is enabled on a media player of a placeshifting system, which allows a user to record media programs from locations that are physically remote from a source of the media programs. The media player may receive program schedule information and present the program schedule information to the user. Based on user input, the media player identifies a media program and associated schedule information. When the media program is scheduled to play, the placeshifting device directs a media recording device to receive the media program and to store the program. The placeshifting device may digitize, transcode, and/or transrate the media program, if necessary, and transmit the media program to the remote device for playback.

20 Claims, 4 Drawing Sheets

(56) References Cited

U.S. PATENT DOCUMENTS

| | | |
|---|---|---|
| 5,132,992 A | 7/1992 | Yurt et al. |
| 5,161,021 A | 11/1992 | Tsai |
| 5,237,648 A | 8/1993 | Mills et al. |
| 5,293,357 A | 3/1994 | Hallenbeck |
| 5,321,846 A | 6/1994 | Yokota et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,537,530 A | 7/1996 | Edgar et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,889,506 A | 3/1999 | Lopresti et al. |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,969,764 A | 10/1999 | Sun et al. |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,023,233 A | 2/2000 | Craven et al. |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,044,396 A | 3/2000 | Adams |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,289,485 B1 | 9/2001 | Shiomoto |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,421,429 B1 | 7/2002 | Merritt et al. |
| 6,434,113 B1 | 8/2002 | Gubbi |
| 6,442,067 B1 | 8/2002 | Chawala et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,277 B1 | 6/2004 | Shaffer et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Maasud et al. |
| 6,788,862 B2 | 9/2004 | Greer et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,910,175 B2 | 6/2005 | Krishnamachari |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,103,905 B2 | 9/2006 | Novak |
| 7,110,558 B1 | 9/2006 | Elliott |

(56) References Cited

U.S. PATENT DOCUMENTS

| | | | |
|---|---|---|---|
| 7,124,366 B2 | 10/2006 | Foreman et al. |
| 7,127,507 B1 | 10/2006 | Clark et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | Dacosta |
| 7,382,729 B2 | 6/2008 | Honda et al. |
| 7,430,686 B1 | 9/2008 | Wang et al. |
| 7,464,396 B2 | 12/2008 | Hejna, Jr. |
| 7,478,164 B1 | 1/2009 | Lango et al. |
| 7,478,166 B2 | 1/2009 | Agnoli et al. |
| 7,502,733 B2 | 3/2009 | Andrsen et al. |
| 7,505,480 B1 | 3/2009 | Zhang et al. |
| 7,516,136 B2 | 4/2009 | Lee et al. |
| 7,565,681 B2 | 7/2009 | Ngo et al. |
| 7,594,218 B1 | 9/2009 | Lozben |
| 7,616,955 B2 | 11/2009 | Kim |
| 7,676,590 B2 | 3/2010 | Silverman et al. |
| 7,676,823 B2 | 3/2010 | Acharya et al. |
| 7,720,432 B1 | 5/2010 | Colby et al. |
| 7,721,300 B2 | 5/2010 | Tipton et al. |
| 7,725,912 B2 | 5/2010 | Margulis |
| 7,778,372 B2 | 8/2010 | Takashima |
| 7,788,696 B2 | 8/2010 | Burges et al. |
| 7,895,275 B1 | 2/2011 | Evans et al. |
| 7,911,946 B2 | 3/2011 | Poli et al. |
| 7,913,278 B2 | 3/2011 | Ellis et al. |
| 7,917,932 B2 * | 3/2011 | Krikorian | 725/88 |
| 7,921,150 B1 | 4/2011 | Schwartz |
| 7,945,688 B1 | 5/2011 | Lango et al. |
| 8,051,454 B2 | 11/2011 | Krikorian et al. |
| 8,060,906 B2 | 11/2011 | Begeja et al. |
| 8,099,755 B2 | 1/2012 | Bajpai et al. |
| 8,365,236 B2 | 1/2013 | Krikorian et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0019984 A1 | 2/2002 | Rakib |
| 2002/0031333 A1 | 3/2002 | Mano et al. |
| 2002/0032907 A1 | 3/2002 | Daniels |
| 2002/0046404 A1 | 4/2002 | Mizutani |
| 2002/0053053 A1 | 5/2002 | Nagai et al. |
| 2002/0080753 A1 | 6/2002 | Lee |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143972 A1 | 10/2002 | Christopoulos et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0151992 A1 | 10/2002 | Hoffberg et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028643 A1 | 2/2003 | Jabri |
| 2003/0028873 A1 | 2/2003 | Lemmons |
| 2003/0030752 A1 | 2/2003 | Begeja et al. |
| 2003/0065915 A1 | 4/2003 | Yu et al. |
| 2003/0078973 A1 | 4/2003 | Przekop et al. |
| 2003/0088686 A1 | 5/2003 | Jennings |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0208612 A1 | 11/2003 | Harris et al. |
| 2003/0231621 A1 | 12/2003 | Gubbi et al. |
| 2003/0231655 A1 | 12/2003 | Kelton et al. |
| 2003/0231868 A1 | 12/2003 | Herley |
| 2003/0234803 A1 | 12/2003 | Toyama et al. |
| 2004/0003406 A1 | 1/2004 | Billmaier |
| 2004/0049791 A1 | 3/2004 | Shah et al. |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0098748 A1 | 5/2004 | Bo et al. |
| 2004/0100486 A1 | 5/2004 | Flamini et al. |
| 2004/0101271 A1 | 5/2004 | Boston et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0205830 A1 | 10/2004 | Kaneko |
| 2004/0212640 A1 | 10/2004 | Mann et al. |
| 2004/0215458 A1 | 10/2004 | Kobayashi et al. |
| 2004/0216173 A1 | 10/2004 | Horoszowski et al. |
| 2004/0236844 A1 | 11/2004 | Kocherlakota |
| 2004/0246936 A1 | 12/2004 | Perlman |
| 2004/0255249 A1 | 12/2004 | Chang et al. |
| 2005/0021398 A1 | 1/2005 | McCleskey et al. |
| 2005/0021830 A1 | 1/2005 | Urzaiz et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0172028 A1 | 8/2005 | Nilsson et al. |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0223087 A1 | 10/2005 | Van Der Stok |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0246451 A1 | 11/2005 | Silverman et al. |
| 2005/0251833 A1 | 11/2005 | Schedivy |
| 2005/0262534 A1 | 11/2005 | Bontempi et al. |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0050970 A1 | 3/2006 | Gunatilake |
| 2006/0051055 A1 | 3/2006 | Ohkawa |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0101499 A1 | 5/2006 | Aravamudan et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0156219 A1 | 7/2006 | Haot et al. |
| 2006/0171395 A1 | 8/2006 | Deshpande |
| 2006/0174026 A1 | 8/2006 | Robinson et al. |
| 2006/0184980 A1 | 8/2006 | Cole |
| 2006/0190616 A1 | 8/2006 | Mayerhofer et al. |
| 2006/0206526 A1 | 9/2006 | Sitomer |
| 2006/0206581 A1 | 9/2006 | Howarth et al. |
| 2006/0230345 A1 | 10/2006 | Weng et al. |
| 2006/0265384 A1 | 11/2006 | Lee et al. |
| 2006/0280157 A1 | 12/2006 | Karaoguz et al. |
| 2006/0280177 A1 | 12/2006 | Gupta et al. |
| 2006/0294183 A1 | 12/2006 | Agnoli et al. |
| 2007/0003224 A1 | 1/2007 | Krikorian et al. |
| 2007/0005783 A1 | 1/2007 | Saint-Hillaire et al. |
| 2007/0022328 A1 | 1/2007 | Tarra et al. |
| 2007/0043792 A1 | 2/2007 | O'Brien |

(56) References Cited

U.S. PATENT DOCUMENTS

| | | |
|---|---|---|
| 2007/0053446 A1 | 3/2007 | Spilo |
| 2007/0061783 A1 | 3/2007 | Prakash |
| 2007/0067390 A1 | 3/2007 | Agnoli et al. |
| 2007/0073767 A1 | 3/2007 | Springer et al. |
| 2007/0074115 A1 | 3/2007 | Patten et al. |
| 2007/0076604 A1 | 4/2007 | Litwack |
| 2007/0097257 A1 | 5/2007 | El-Maleh et al. |
| 2007/0127437 A1 | 6/2007 | Ozawa |
| 2007/0136778 A1 | 6/2007 | Birger et al. |
| 2007/0168543 A1 | 7/2007 | Krikorian et al. |
| 2007/0180485 A1 | 8/2007 | Dua |
| 2007/0198532 A1 | 8/2007 | Krikorian et al. |
| 2007/0234213 A1 | 10/2007 | Krikorian et al. |
| 2007/0260462 A1 | 11/2007 | Andrsen et al. |
| 2007/0274327 A1 | 11/2007 | Kaarela et al. |
| 2007/0286596 A1 | 12/2007 | Lonn |
| 2007/0290876 A1 | 12/2007 | Sato et al. |
| 2008/0007651 A1 | 1/2008 | Bennett |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0134267 A1 | 6/2008 | Moghe et al. |
| 2008/0195698 A1 | 8/2008 | Stefanovic et al. |
| 2008/0195744 A1 | 8/2008 | Bowra et al. |
| 2008/0199150 A1 | 8/2008 | Candelore |
| 2008/0215392 A1 | 9/2008 | Rajan |
| 2008/0256485 A1 | 10/2008 | Krikorian |
| 2008/0294759 A1 | 11/2008 | Biswas et al. |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0074380 A1* | 3/2009 | Boston et al. .......... 386/83 |
| 2009/0080448 A1 | 3/2009 | Tarra et al. |
| 2009/0102983 A1 | 4/2009 | Malone et al. |
| 2009/0103607 A1 | 4/2009 | Bajpai et al. |
| 2009/0157697 A1 | 6/2009 | Conway et al. |
| 2009/0157777 A1 | 6/2009 | Golwalkar et al. |
| 2009/0177758 A1 | 7/2009 | Banger et al. |
| 2009/0199248 A1 | 8/2009 | Ngo et al. |
| 2009/0252219 A1 | 10/2009 | Chen et al. |
| 2009/0254672 A1 | 10/2009 | Zhang |
| 2009/0268740 A1 | 10/2009 | Sindhu et al. |
| 2009/0300205 A1 | 12/2009 | Jabri |
| 2010/0001960 A1 | 1/2010 | Williams |
| 2010/0005483 A1 | 1/2010 | Rao |
| 2010/0023642 A1 | 1/2010 | Ladd et al. |
| 2010/0064055 A1 | 3/2010 | Krikorian et al. |
| 2010/0064332 A1 | 3/2010 | Krikorian et al. |
| 2010/0070925 A1 | 3/2010 | Einaudi et al. |
| 2010/0071076 A1 | 3/2010 | Gangotri et al. |
| 2010/0100915 A1 | 4/2010 | Krikorian et al. |
| 2010/0129057 A1 | 5/2010 | Kulkarni |
| 2010/0146527 A1 | 6/2010 | Craib et al. |
| 2010/0169477 A1 | 7/2010 | Stienhans et al. |
| 2010/0192007 A1 | 7/2010 | Tarra et al. |
| 2010/0192186 A1 | 7/2010 | Margulis |
| 2010/0192188 A1 | 7/2010 | Rao |
| 2010/0226444 A1 | 9/2010 | Thevathasan et al. |
| 2010/0232437 A1 | 9/2010 | Bajpal et al. |
| 2010/0232438 A1 | 9/2010 | Bajpal et al. |
| 2010/0232439 A1 | 9/2010 | Asnis et al. |
| 2010/0268832 A1 | 10/2010 | Lucas et al. |
| 2010/0269144 A1 | 10/2010 | Forsman et al. |
| 2010/0281042 A1 | 11/2010 | Windes et al. |
| 2010/0309916 A1 | 12/2010 | Oskouy et al. |
| 2011/0002381 A1 | 1/2011 | Yang et al. |
| 2011/0019839 A1 | 1/2011 | Nandury |
| 2011/0032986 A1 | 2/2011 | Banger et al. |
| 2011/0033168 A1 | 2/2011 | Iyer |
| 2011/0035462 A1 | 2/2011 | Akela |
| 2011/0035466 A1 | 2/2011 | Panigrahi |
| 2011/0035467 A1 | 2/2011 | Thiyagarajan et al. |
| 2011/0035668 A1 | 2/2011 | Thiyagarajan |
| 2011/0035669 A1 | 2/2011 | Shirali et al. |
| 2011/0035741 A1 | 2/2011 | Thiyagarajan |
| 2011/0035765 A1 | 2/2011 | Shirali |
| 2011/0047079 A1 | 2/2011 | Du et al. |
| 2011/0050908 A1 | 3/2011 | Nam |
| 2011/0051016 A1 | 3/2011 | Malode |
| 2011/0055864 A1 | 3/2011 | Shah et al. |
| 2011/0113354 A1 | 5/2011 | Thiyagarajan et al. |
| 2011/0119325 A1 | 5/2011 | Paul et al. |
| 2011/0125861 A1 | 5/2011 | Evans et al. |
| 2011/0150432 A1 | 6/2011 | Paul et al. |
| 2011/0153718 A1 | 6/2011 | Dham et al. |
| 2011/0153845 A1 | 6/2011 | Rao et al. |
| 2011/0158610 A1 | 6/2011 | Paul et al. |
| 2011/0191456 A1 | 8/2011 | Jain |
| 2011/0307608 A1 | 12/2011 | Chang et al. |
| 2012/0166669 A1 | 6/2012 | Price |
| 2012/0219001 A1 | 8/2012 | Sindhu et al. |

FOREIGN PATENT DOCUMENTS

| | | |
|---|---|---|
| CN | 1464685 A | 12/2003 |
| DE | 4407319 A1 | 9/1994 |
| EP | 0515101 A2 | 11/1992 |
| EP | 1443766 A2 | 8/2004 |
| GB | 2307151 A | 5/1997 |
| JP | 11289350 A | 10/1999 |
| JP | 2001054066 A | 2/2001 |
| JP | 2003046582 A | 2/2003 |
| JP | 2003114845 A | 4/2003 |
| JP | 2003179580 A | 6/2003 |
| JP | 2004007127 A | 1/2004 |
| JP | 2004072686 A | 3/2004 |
| JP | 2005032120 A | 2/2005 |
| KR | 20010211410 A | 8/2001 |
| KR | 19990082855 A | 2/2010 |
| TW | 200703018 A | 1/2007 |
| WO | 9837701 | 8/1998 |
| WO | 0072596 A1 | 11/2000 |
| WO | 0133839 A1 | 5/2001 |
| WO | 0147248 A2 | 6/2001 |
| WO | 0193161 A1 | 12/2001 |
| WO | 02073443 A1 | 9/2002 |
| WO | 03052552 A2 | 6/2003 |
| WO | 2004032511 A1 | 4/2004 |
| WO | 2004045218 A1 | 5/2004 |
| WO | 2008024723 A1 | 2/2008 |

OTHER PUBLICATIONS

USPTO, Non-Final Office Action, mailed Aug. 4, 2009; U.S. Appl. No. 11/734,277, filed Apr. 12, 2007.
USPTO, Non-Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
European Patent Office, International Searching Authority, "International Search Report," for International Application No. PCT/US2009/049006, mailed Sep. 11, 2009.
Australian Government "Office Action," Australian Patent Application No. 2006240518, mailed Nov. 12, 2009.
USPTO, Final Office Action, mailed Nov. 6, 2009; U.S. Appl. No. 09/809,868, filed Mar. 15, 2001.
USTO, Final Office Action mailed Nov. 12, 2009; U.S. Appl. No. 11/620,707, filed Jan. 7, 2007.
Newton's Telecom Dictionary, 21st ed., Mar. 2005.
European Patent Office, European Search Report, mailed Sep. 28, 2009 for European Application No. EP 06 78 6175.
USPTO Final Office Action mailed Jan. 25, 2010; U.S. Appl. No. 11/734,277, filed Apr. 12, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.

(56) References Cited

OTHER PUBLICATIONS

Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Srisuresh, P. et al. "Traditional IP Network Address Translator (Traditional NAT)," Network Working Group, The Internet Society, Jan. 2001.
China State Intellectual Property Office "First Office Action," Jan. 8, 2010; Application No. 200810126554.0.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
.Gurzhi, Alexander et al. "Systems and Methods for Emulation Network-Enabled Media Components," U.S. Appl. No. 12/711,830, filed Feb. 24, 2010.
Newton's Telcom Dictionary, 20th ed., Mar. 2004.
"The Authoritative Dictionary of IEEE Standard Terms," 7th ed. 2000.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0/7803-6452-3, lines 15-20 of sec. II on p. 293, fig. 1.
European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
USPTO Non-Final Office Action mailed Aug. 11, 2010; U.S. Appl. No. 11/111,265, filed Apr. 21, 2005.
USPTO Final Office Action mailed Sep. 24, 2010; U.S. Appl. No. 11/620,707, filed Jan. 7, 2007.
Canadian Patent Office "Office Action" mailed Mar. 17, 2011; Canadian Patent Appln. No. 2,606,235.
USPTO "Final Office Action" mailed Mar. 10, 2011; U.S. Appl. No. 11/111,265, filed Apr. 21, 2005.
USPTO Non-Final Office Action mailed Sep. 30, 2010; U.S. Appl. No. 12/758,196, filed Apr. 12, 2010.
USPTO Non-Final Office Action mailed Oct. 4, 2010; U.S. Appl. No. 12/643,812, filed Dec. 21, 2009.
Japan Patent Office "Notice of Grounds for Rejection (Office Action)," mailed May 25, 2010; Patent Application No. 2007-0268269.

Japan Patent Office "Notice of Grounds for Rejection (Office Action)," mailed May 25, 2010; Patent Application No. 2007-527683.
China State Intellectual Property Office "First Office Action of China State Intellectual Property Office," issued Oct. 9, 2010; Application No. 200780030811.4.
European Patent Office "EPO Communication" dated Nov. 29, 2010; Application No. 08 167 880.7-2202.
Korean Intellectual Property Office "Official Notice of Preliminary Rejection," issued Dec. 29, 2010; Patent Application No. 10-2009-7003607.
China State Intellectual Property Office "Second Office Action of China State Intellectual Property Office," issued Aug. 26, 2010; Application No. 200810126554.0.
Sikora, Thomas "Trends and Perspectives in Image and Video Coding," Proceedings of the IEEE, vol. 93 No. 1, pp. 6-17, Jan. 1, 2005.
Vetro, Anthony et al. "Video Transcoding Architectures and Techniques: An Overview," IEEE Signal Processing Magazine, vol. 20, No. 2, pp. 18-29, Mar. 1, 2003.
De Lattre, Alexis et al. "VideoLAN Streaming Howto," Internet Citation, Jan. 22, 2005; http://www.videolan.org/doc/streaming-howto/en/.
European Patent Office "Extended European Search Report" dated Feb. 28, 2011; Appln. No. 06734554.
USPTO "Non-Final Office Action" mailed Sep. 16, 2011; U.S. Appl. No. 11/111,265, filed Apr. 21, 2005.
USPTO "Non-Final Office Action" mailed Sep. 6, 2011; U.S. Appl. No. 12/347,465, filed Dec. 31, 2008.
USPTO "Notice of Allowance" mailed Sep. 22, 2011; U.S. Appl. No. 12/979,145, filed Dec. 27, 2010.
Eurpoean Patent Office, Examination Report, dated Sep. 6, 2013 for European Patent Application No. 12 187 858.1.
Japan Patent Office, Hearing, dated Aug. 13, 2013 for Japanese Patent Application No. P2008-507651.
European Patent Office, Examination Report, dated Jul. 25, 2013 for European Patent Application No. 05 758 509.3.
China State Intellectual Property Office, First Office Action, dated Aug. 2, 2013 for Chinese Patent Application No. 200980151308.3.
USPTO, Non-Final Office Action, dated Aug. 7, 2013 for U.S. Appl. No. 13/609,033.
USPTO, Final Office Action, dated Sep. 19, 2013 for U.S. Appl. No. 13/107,341.
Canadian Intellectual Property Office, Office Action, dated Sep. 3, 2013 for Canadian Patent Application No. 2,660,350.
USPTO, Notice of Allowance, dated Sep. 20, 2013 for U.S. Appl. No. 13/079,644.
Japan Patent Office "Hearing" mailed Apr. 24, 2012 for Japanese Patent Appln. No. 2007-527683.
Japan Patent Office "Hearing" mailed Apr. 24, 2012 for Japanese Patent Appln. No. 2007-268269.
European Patent Office "Office Action" dated Aug. 7, 2012 for European Patent Appln. No. 06 734 554.6.
China Patent Office "Office Action" issued Aug. 3, 2012 for Chinese Patent Appln. No. 200810161874.X.
USPTO "Notice of Allowance" mailed Aug. 31, 2012 for U.S. Appl. No. 11/620,711, filed Jan. 7, 2007.
M2 Presswire, Aug. 16, 2006, OTCPicks.com; Daily Market Movers Digest Midday Stock Alerts for Wednesday, Aug. 16th, AMRU, IPTM, BCLC, IHDR, EGIL © 1994-2006 M2 Communications LTD.
USPTO "Notice of Allowance" mailed Jun. 12, 2012 for U.S. Appl. No. 13/240,932, filed Sep. 22, 2011.
USPTO "Final Office Action" mailed Jun. 6, 2012 for U.S. Appl. No. 12/827,964, filed Jun. 30, 2010.
USPTO "Notice of Allowance" mailed Jul. 6, 2012 for U.S. Appl. No. 11/111,265, filed Apr. 21, 2005.
USPTO "Non-Final Office Action" mailed Oct. 23, 2012 for U.S. Appl. No. 13/194,783, filed Jul. 29, 2011.
USPTO "Non-Final Office Action" mailed Sep. 14, 2012 for U.S. Appl. No. 12/635,138, filed Dec. 12, 2009.
USPTO "Notice of Allowance" mailed Sep. 25, 2012 for U.S. Appl. No. 13/240,932, filed Sep. 22, 2011.

(56) References Cited

OTHER PUBLICATIONS

USPTO "Notice of Allowance", mailed Oct. 18, 2011; U.S. Appl. No. 12/339,878, filed Dec. 19, 2008.
China State Intellectual Property Office, Decision of Rejection:, Issued Sep. 15, 2011; Chine Patent Appln. No. 200780030811.4.
Canadian Intellectual Property Office, "Office Action" mailed Nov. 28, 2011; Canadian Appln. No. 2,606,235.
USPTO, Non-Final Office Action, mailed Jan. 6, 2014 for U.S. Appl. No. 13/615,306.
USPTO, Non-Final Office Action, mailed Jan. 6, 2014 for U.S. Appl. No. 12/827,964.
USPTO "Non-Final Office Action" mailed Jan. 10, 2012; U.S. Appl. No. 12/827,964, filed Jun. 30, 2010.
Chinese Office Action, dated Dec. 31, 2011, for Chinese Patent Application No. 200810161874.
European Office Action, dated Nov. 30, 2011, for European Patent Application No. 06 734 554.6-2223.
China State Intellectual Property Office, "Reexamination Office Action" mailed Mar. 5, 2012; Chinese Appln. No. 200580026825.
China State Intellectual Property Office "Fourth Office Action" dated Mar. 5, 2013 for Chinese Patent Appln. No. 200810161874.X.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms, "Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path+articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025911, mailed Jan. 3, 2007.
European Patent Office "European Search Report," mailed May 7, 2010 for Application No. 06786174.0.
China State Intellectual Property Office "Office Action," issued Apr. 13, 2010; Application No. 200580026825.X.
Canadian Intellectual Property Office "Office Action" mailed Feb. 18, 2010 for Application No. 2569610.
China State Intellectual Property Office "Office Action" issued Mar. 18, 2010, for Application No. 200680022520.6.
China Patent Office "Office Action" mailed Feb. 23, 2011; Chinese Patent Appln. No. 200680022520.6.
China Patent Office "Office Action" mailed Jan. 6, 2911; Chinese Patent Appln. No. 200810126554.0.
Japan Patent Office "Notice of Grounds for Rejection (Office Action)" mailed Jun. 28, 2011; Japanese Patent Appln. No. P2008-507651.
USPTO "Final Office Action" mailed Apr. 27, 2012; U.S. Appl. No. 12/347,465, filed Dec. 31, 2008.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL: http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 091809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809.868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.

(56) References Cited

OTHER PUBLICATIONS

USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
International Search Report and Written Opinion for International Application No. PCT/US20061025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL: http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>, retrieved on Jan. 28, 2009.
Uspto Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
European Patent Office, International Searching Authority, "International Search Report," mailed Mar. 30, 2010; International Application PCT/US2009/068468 filed Dec. 27, 2009.
Canadian Intellectual Property Office, Office Action mailed Sep. 30, 2013 for Canadian Patent Application No. 2,747,539.
USPTO, Final Office Action mailed Dec. 5, 2013 for U.S. Appl. No. 13/194,834.
USPTO "Non-Final Office Action" mailed Feb. 24, 2012; U.S. Appl. No. 13/240,932, filed Sep. 22, 2011.
China Intellectual Property Office, "Second Office Action" mailed Feb. 15, 2012; Appln. No. CN200680022520.6.
European Patent Office, Extended Search Report mailed May 24, 2013 for European Patent Application No. 07814265.0.
USPTO, Final Office Action mailed May 8, 2013 for U.S. Appl. No. 13/194,783.
USPTO, Office Action mailed May 8, 2013 for U.S. Appl. No. 13/194,834.
USPTO, Office Action mailed Jun. 19, 2013 for U.S. Appl. No. 12/827,964.
USPTO, Office Action mailed Jun. 20, 2013 for U.S. Appl. No. 13/615,306.
USPTO, Notice of Allowance mailed Jun. 24, 2013 for U.S. Appl. No. 12/635,138.
USPTO, Final Office Action mailed Jul. 17, 2013 for U.S. Appl. No. 13/079,644.
China State Intellectual Property Office, Office Action, dated Jul. 1, 2013 for China Patent Appln. No. 200680022520.6.
Chinese Intellectual Property Office "Office Action" mailed Apr. 10, 2012 for Chinese Application 200810126554.0.
Japan Patent Office "Office Action" mailed Feb. 28, 2012 for Japanese Application P2008-507651.
Canadian Intellectual Property Office "Office Action" mailed on Feb. 16, 2012 for Canadian Application 2,660,350.
Taiwan Intellectual Property Office "Office Action" mailed Feb. 23, 2012 for Taiwan Application 097137393.
Intellectual Property Office "Office Action" dated Feb. 25, 2013 for Taiwan Patent Appln. No. 098146025.
China State Intellectual Property Office, Office Action, dated Sep. 29, 2013 for Chinese Patent Application No. 200810161874.X.
China State Intellectual Property Office "Third Office Action" issued Dec. 5, 2012 for Chinese Patent Appln. No. 200680022520.6.
European Patent Office "Extgended Search Report" dated Nov. 27, 2011 for European Patent Appln. No. 12187858.1.
Japanese Patent Office "Decision of Rejection (Final Rejection)" dated Jan. 29, 2013 for Japanese Patent Appln. No. 2008-507651.
USPTO "Non-Final Office Action" dated Mar. 11, 2013 for U.S. Appl. No. 13/079,644.
USPTO "Non-Final Office Action" dated Mar. 5, 2013 for U.S. Appl. No. 13/107,341.
European Patent Office Supplementary Search Report dated Mar. 6, 2013 for European Patent Appln. No. 05758509.3.
Li Zhuo et al: "Adaptive forward error correction for streaming stored MPEG-4 FGS video over wireless channel", IEEE 5th Workshop on Signal Processing Advances in Wireless Communications, 2004, Jan. 1, 2004, pp. 26-30, XP055091312, DOI: 10.1109/SPAWC.2004.1439196 ISBN: 978-0-78-038337-1.
European Patent Office, Summons to attend oral proceedings pursuant to Rule 115(1) EPC, mailed Jan. 15, 2014 for European Patent Application No. 06734554.6.
Japan Patent Office, Notice of Ground(s) for Rejection, mailed Feb. 18, 2014 for Japanese Patent Application No. P2008-507651.
Office of the Controller-General of Patents, Designs and Trademarks, First Examination Report, mailed Mar. 21, 2014 for India Patent Application No. 3740/KOLNP/2006.
USPTO, Non-Final Office Action, mailed May 15, 2014 for U.S. Appl. No. 13/194,783.
USPTO, Notice of Allowance, mailed May 28, 2014 for U.S. Appl. No. 13/615,306.
USPTO, Final Office Action, mailed Jun. 18, 2014 for U.S. Appl. No. 13/609,033.
USPTO, Non-Final Office Action, mailed Jul. 16, 2014 for U.S. Appl. No. 13/194,834.

* cited by examiner

PERSONAL VIDEO RECORDER FUNCTIONALITY FOR PLACESHIFTING SYSTEMS

CROSS REFERENCE TO RELATED APPLICATIONS

This application is a continuation of U.S. patent application Ser. No. 11/933,969 filed on Nov. 1, 2007, now U.S. Pat. No. 7,917,932, which is a continuation-in-part of U.S. patent application Ser. No. 11/147,664, filed on Jun. 7, 2005, now U.S. Pat. No. 7,877,776, which claims priority to U.S. Provisional Application Ser. No. 60/577,833 filed on Jun. 7, 2004. These applications are hereby incorporated by reference in their entirety.

BACKGROUND

1. Field of the Invention

This invention relates generally to media applications, and in particular to recording media programs using personal video recorder (PVR) functionality.

2. Background of the Invention

Television and other video content are increasingly finding a home on mobile devices, such as mobile phones, personal digital assistants (PDAs), and personal video players (PVPs). For example, television programming is no longer found solely on the television. Through computer networks, as well as other delivery mechanisms, television and other media content are increasingly becoming available on these mobile devices.

As users get more accustomed to video experiences on mobile devices, and as mobile storage solutions (e.g., removable flash media and small hard disk drives) become more robust and inexpensive, the desire to add personal video recorder (PVR) functionality to these devices will emerge. A device with PVR functionality can record video data in digital format on digital storage (e.g., computer memory, hard disk drives). The device with PVR functionality can also provide other control features, such as playback, fast forwarding, rewinding, and pausing, plus the ability to skip to any part of the program without having to rewind or fast forward the data stream.

Traditionally, PVR functionality is implemented in devices, such as set-top boxes, that physically connect to a media source (e.g., television cables, satellite disks), store television programs, and transmit the stored programs to an output device, such as a television. However, existing PVR devices are typically stationary, and even if a PVR device could be transported to another location, the media source connected to the PVR device cannot. For example, one could not take a home cable subscription on the road, even if one could theoretically bring a PVR device along. Because a PVR device cannot record programs without a media source providing the media to record, the traditional approach cannot adequately provide a PVR functionality in mobile devices.

Accordingly, there is a need for a PVR functionality on mobile devices, or devices at a location remote from a media source, to allow users to record media programs on those devices.

SUMMARY

Embodiments of the invention provide a PVR functionality in combination with a placeshifting system to allow users to record media programs from a location remote from the media source. In one embodiment, a media player of a placeshifting system having PVR functionality receives media program schedule information and presents to its users. Based on a user input (or command), the media player identifies a media program and associated schedule information. When the media program is scheduled to play, the media player requests a media broadcasting device to receive the media program, digitize, transcode, and/or transrate the media program if necessary, and transmit to the media player. The media player records the media program in local storage and presents a notice when the media program is ready to play.

In one embodiment, the media player recovers from transmission interruptions of the media program and resumes the transmission and recording of the media program. In another embodiment, the media player adjusts the transmission and recording of the media program to reduce the impacts on other tasks performed by the media player.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the invention provide a PVR functionality in placeshifting systems for their users to record media programs from locations that are physically remote from media sources. A media player displays schedule information for media programs available at a media source. A user identifies a media program in the media player. The media player requests a media broadcasting device to receive the media program from the media source and transmit to the media player. The media player records the media program received from the media broadcasting device and presents a notice to the user. As used herein, a media program may include any type of media content, including audio or video content, or both.

System Architecture

Figure 1:
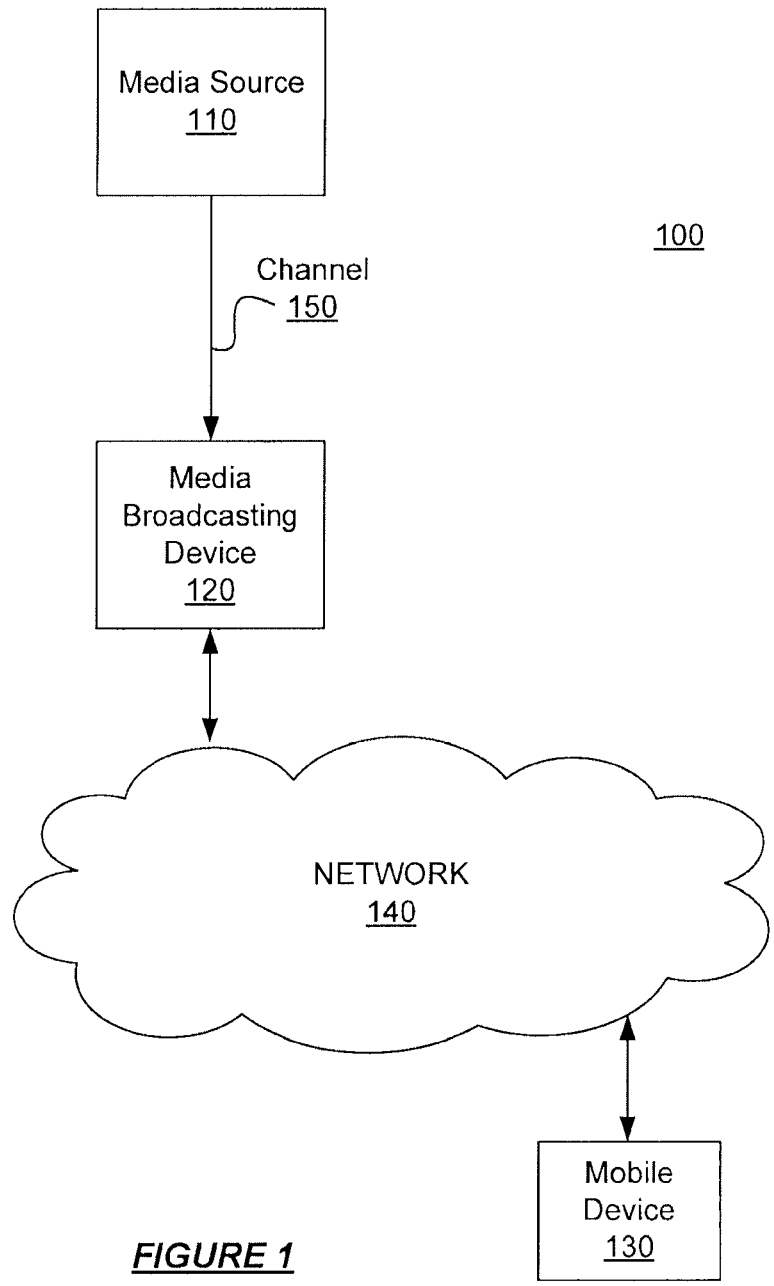
FIG. 1 is a block diagram of a computing environment for recording media programs in a placeshifting system, in accordance with an embodiment of the invention.

FIG. 1 is a block diagram of a computing environment 100 for recording media programs in a placeshifting system according to one embodiment of the invention. As illustrated, the computing environment 100 includes a media source 110, a media broadcasting device (hereinafter called broadcaster) 120, and a media player 130. The media source no is communicatively connected to the broadcaster 120 through a channel 150. The broadcaster 120 and the media player 130 are communicatively connected through a network 140.

The media source 110 includes hardware and/or software devices that are configured to transmit media content to the broadcaster 120. Examples of the media source 110 include a cable set-top box, a tuner (e.g., a cable tuner), a DVD/VCD/VHS player, a time-shifting device, and a computer. The media source no may provide services such as video on demand or pay-per-view.

The media source 110 may retrieve the media content from a local storage (e.g., a DVD) or receive it from a remote source (e.g., a remote computer server). The media source 110 may receive the media content through a variety of pathways, including, but not limited to, the following: over the air via analog or digital RF transmission; Internet protocol (IP) transmission delivered over a wired/wireless network and satellite transmission.

In one embodiment, the media source 110 receives radio frequency signal (RF signal) from a broadcast station (the source broadcaster) such as a radio station or a television station. Because an RF signal may include a number of video and/or audio signals modulated therein, the media source 110 may filter the RF signal for a selected channel, demodulate the channel, and convert the signal into separate analog video and/or audio signals.

The broadcaster 120 includes hardware and/or software devices that are configured to receive media content from the media source no through the channel 150 and transmit media content to the media player 130 through the network 140. In one embodiment, the broadcaster 120 can digitize, transcode, and/or package the media content before sending it to the media player 130. In one embodiment, the broadcaster 120 may be a media broadcasting device of a placeshifting system (e.g., a personal broadcaster). The broadcaster 120 may receive media content from multiple media sources (not shown).

A placeshifting system includes a media broadcasting device and a media player. Using a placeshifting system, a user can watch or listen to live, recorded or stored media on a remote device via a data network. For example, a user may stream content from a media broadcasting device at home (such as a satellite receiver, cable box, or digital video recorder) to a media player (such as an application executing on a cellular phone), which can receive the media from across the house, across town, or across the world. This transmission may use public or private networks. A media broadcasting device product that currently provides such a placeshifting application is the SLINGBOX™ from Sling Media, Inc., and described in U.S. application Ser. No. 11/147,664, filed Jun. 7, 2005, the content of which is incorporated by reference in its entirety.

In one embodiment, the broadcaster 120 may convert the received media content from one media format to another or perform any other transcoding, encoding/decoding, translation, digitization (such as converting media content from analog form to digital form), or other processing on received media content as desired.

The broadcaster 120 may transmit media content to the media player 130 responsive to a request from the media player 130. Alternatively, the broadcaster 120 may transmit the media content to the media player 130 using content delivery mechanisms such as push technology (e.g., server push or web casting). As suggested by its name, the broadcaster 120 may transmit the media content to multiple devices, such as a HDTV, a VCR, a projector, and one or more media players 130. In one embodiment, the broadcaster 120 transmits media content as one or more media streams. A media stream may be sent as a series of small packets. The broadcaster 120 may send the media stream using common network protocols (e.g., Internet protocol, user datagram protocol).

In one embodiment, the broadcaster 120 may receive commands and operate according to the commands. For example, a command can direct the broadcaster 120 to switch to a specific channel, convert media content to a specific format (e.g., high-definition resolution video), and/or transmit a media program to a specific device using a network protocol. A media player 130 may transmit the commands to the broadcaster 120 through the network 140. In one embodiment, the broadcaster 120 authorizes a device before accepting commands from the device and/or operating according to commands from the device.

The media player 130 includes hardware and/or software devices that are configured to receive and record media content from the broadcaster 120 through the network 140. Regarding software, the media player 130 can be, for example, one or more applications executing within one or more operating systems on a remote device. The remote device may be a generate purpose computer (e.g., a mobile computer, a personal digital assistant (PDA)) or a mobile communication device (e.g., a mobile phone). Regarding hardware, the media player can be a special purpose device such as a personal video player (PVP) with network capability.

In one embodiment, the media player 130 may provide schedule information for media programs to be broadcasted by the source broadcaster or available at the media source no, and/or receive user inputs identifying media programs intended to be recorded on the media player 130. The media player 130 may retrieve the schedule information from an electronic programming guide (EPG) service provider. The media player 130 may generate commands based on the user inputs and the schedule information and transmit the commands to the broadcaster 120, instructing the broadcaster 120 to transmit the identified media programs to the media player 130.

The network 140 represents the communication pathways between the broadcaster 120 and the media player 130. The network 140 may be a wired or wireless network. Examples of the network 140 include the Internet, an intranet, a cellular network, or a combination thereof.

The channel 150 is the delivery pathway through which the media source no transmits media content to the broadcaster 120. The channel 150 may be a wired or wireless cable connection (e.g., A/V cable, monitor cable, and the like). In one embodiment, the channel 150 may be completely within a device, such as where the broadcaster 120 is on the same device as the media source 110.

Remote Device Architecture

Figure 2:
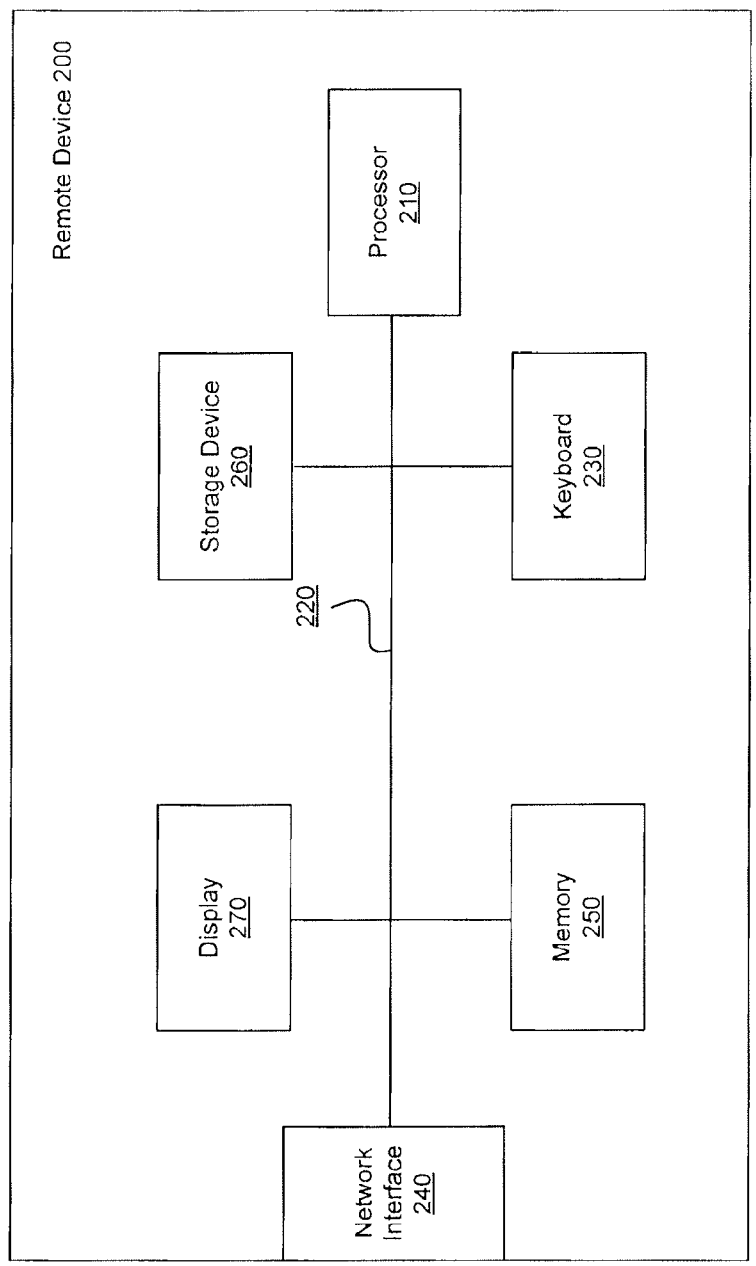
FIG. 2 is a block diagram illustrating the architecture of a remote device, in accordance with an embodiment of the invention.

Referring to FIG. 2, there is shown a block diagram illustrating the architecture of a remote device 200 executing the media player 130 as illustrated in the environment 100 of FIG. 1 according to one embodiment of the invention. As shown, the remote device 200 includes a processor 210 coupled to a bus 220. Also coupled to the bus 220 are a keyboard 230, a network interface 240, a memory 250, a storage device 260, and a display 270.

The processor 210 may be any general-purpose or application-specific processor. The storage device 260, in one embodiment, is a hard disk drive or any other device capable of storing data, such as a solid-state memory device (e.g., flash memory). The memory 250 may be, for example, firmware, read-only memory (ROM), non-volatile random access memory (NVRAM), and/or RAM, and holds instructions and data used by the processor 210. The network interface 240 couples the remote device 200 to the network 140. The bus 220 is an electrical conductor that serves as an electrical pathway along which signals are sent from components connected to the bus. The display 270 is an output screen on which visual information is displayed. The display 270 may be a touch-sensitive screen which users can interact with the media player 130 by touching the display 270. The keyboard 230 may be a standard keypad for touch-tone telephones, a QWERTY keyboard, or any other type of input device. In many instances, the remote device 200 lacks one or more of the elements shown in FIG. 2, such as the keyboard 230.

As is known in the art, the remote device 200 is adapted to execute computer program modules (or programs). As used herein, the term "module" refers to computer program logic and/or data for providing a specified functionality. A module can be implemented in hardware, firmware, and/or software. In one embodiment, the modules are stored on the storage device 260, loaded into the memory 250, and executed by the processor 210.

Modules of Media Player

Figure 3:
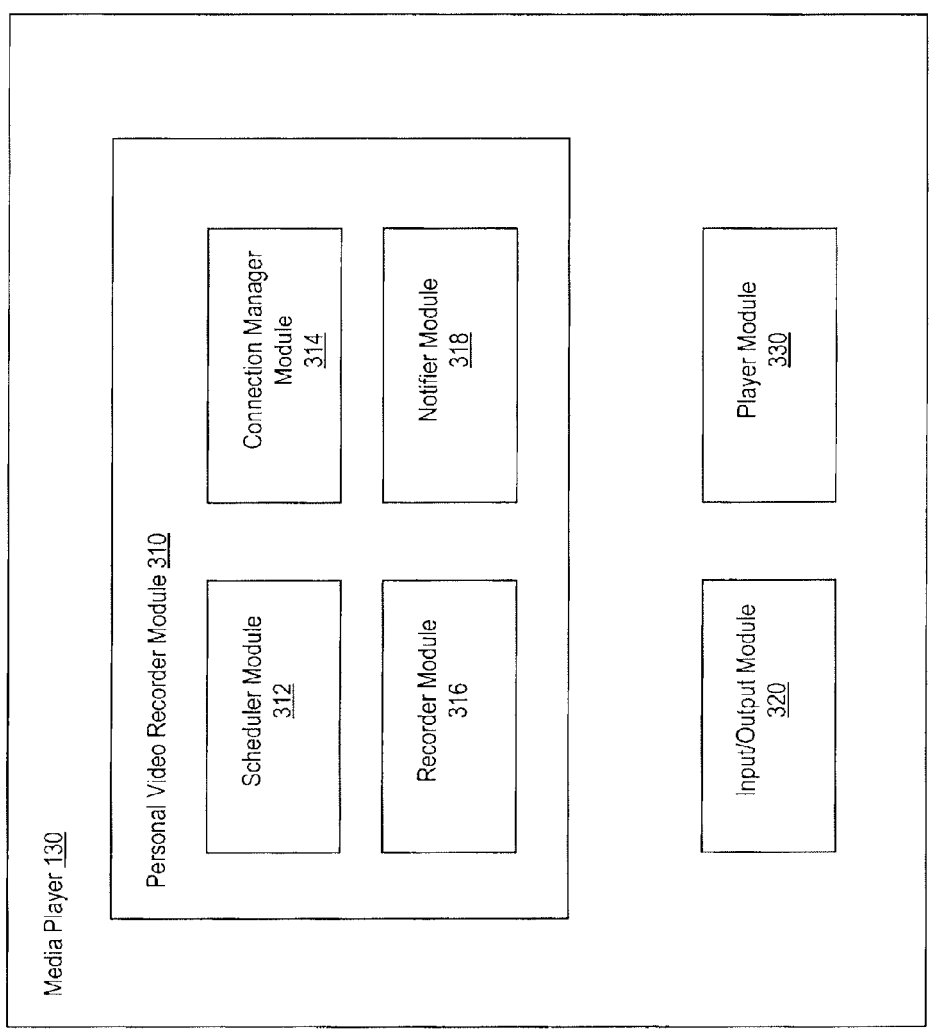
FIG. 3 is a block diagram illustrating modules within a media player illustrated in the environment of FIG. 1, in accordance with an embodiment of the invention.

FIG. 3 is a block diagram illustrating the modules of the media player 130 according to an embodiment of the invention. Other embodiments have additional and/or different modules than the ones shown in the figure. In addition, functionalities can be distributed among the modules in a manner different than described here. Further, some of the functions can be provided by entities other than the media player 130. As illustrated in FIG. 3, the media player 130 includes a PVR module (also may be referenced as a remote client application) 310, an input/output module 320, and a player module 330.

The PVR module 310 is designed to provide a PVR functionality for the media player 130. The PVR module 310 includes a scheduler module 312, a connection manager module 314, a recorder module 316, and a notifier module 318. All or portions of the PVR module 310 can reside on the broadcaster 120, the remote device 200, and/or an intermediate device. For example, the scheduler module 312, the connection manager module 314, and the notifier module 318 may reside on the remote device 200, while the recorder module 316 may locate on the broadcaster 120.

The scheduler module 312 is configured to provide users of the media player 130 with schedule information of the media programs to be broadcasted by the source broadcaster or available at the media source 110. For example, the scheduler module 312 may display a list of television programs that is available from one or multiple television stations and/or cable television providers of the media source 110. The scheduler module 312 may retrieve the scheduling information from an EPG service provider. Alternatively, the scheduler module 312 may retrieve the schedule information from external sources (e.g., the media source 110 and/or the broadcaster 120) or local storage (e.g., the storage device 260). In one embodiment, the scheduler module 312 may enable a user to conduct searches in the schedule information for media programs.

The scheduler module 312 is also configured to receive user inputs identifying the media program for recording. The user may select one, a series of, or a portion of a media program as presented in the schedule information. The user may make the selection through the input/output module 320. In one embodiment, the scheduler module 312 may accept user inputs identifying a media program without presenting the schedule information. For example, the user may learn about a media program's schedule from a friend or a TV Guide magazine and input the schedule information to the scheduler module 312 to identify the media program. The user may also input other information related to the media recording. For example, if the user would like to watch a television show as soon as it becomes available, the user may select the show for recording and assign a high priority to it. As another example, the user may set the scheduler module 312 to record media programs on another device (e.g., the broadcaster 120).

The scheduler module 312 translates the user inputs into a set of commands that can be executed in the broadcaster 120. For example, the user inputs may include the scheduled starting date and time, duration, channel number, preferred format of a television program, and a preferred transmission mechanism. The corresponding set of commands include commands for switching channel, commands for setting the starting time, commands for converting the television program into the preferred format, and commands for transmitting the converted television program to the media player 130 using the preferred transmission mechanism.

The scheduler module 312 transmits the set of commands to the broadcaster 120. In one embodiment, the scheduler module 312 maintains a schedule calendar including all the media programs selected for recording. When a selected media program is scheduled to play, the scheduler module 312 transmits the corresponding set of commands to the broadcaster 120 so that it transmits the media program to the media player 130 (or some other devices) or records the media program locally. Alternatively, the scheduler module 312 may transmit the set of commands to the broadcaster 120 before the scheduled time of the associated media program. The broadcaster 120 may schedule the transmission of the associated media program to the media player 130 according to these commands.

The connection manager module 314 is configured to establish connections with the broadcaster 120 using the network interface 240. The connection establishment may be initiated by the connection manager module 314 or the broadcaster 120. In one embodiment, the connection manager module 314 may detect the network protocols (or communication protocols) supported by the network interface 240, and use a supported network protocol to establish the connection with the broadcaster 120. The connection manager module 314 may engage in an authorization process with the broadcaster 120 to obtain permission to transmit commands to the broadcaster 120 and/or to accept media programs from the broadcaster 120.

The recorder module 316 is configured to record media programs in local storages. Depending on the location of the recorder module 316, it may record the media programs in storages of the remote device 200, the broadcaster 120, or an intermediate device. As described above with reference to the broadcaster 120 in FIG. 1, the broadcaster 120 may transmit the media program as a media stream in a series of small packets. The recorder module 316 may record the media program as these packets arrive.

The notifier module 318 is configured to issue a notice indicating that a media program is recorded and ready for users to enjoy. For example, the notifier module 318 may display a message on the display 270 of the media player 130 stating that a television program is ready for viewing. The notifier module 318 may also present notices before a media program is fully recorded. For example, if a user indicated a high priority for a scheduled radio program, the notifier module 318 may present a notice to the user as soon as the broadcaster 120 starts transmitting the radio program to the media player 130. This allows the user to listen to the radio program in real time (or near real time).

The input/output module 320 is configured to receive user inputs and present output information (e.g., media programs, schedule information, and notices) on the media player 130. The input/output module 320 may receive user inputs via input devices such as the keyboard 230, a touch-sensitive screen, a microphone, and a camera. The input/output module 320 may output information via output devices such as the display 270. In one embodiment, the input/output module 320 may output the media program to an external device such as a speaker, a monitor, and a projector.

The player module 330 is configured to play media programs received from the broadcaster 120 or locally recorded media programs. The player module 330 may also be configured to provide other control features, such as playback, fast forwarding, rewinding, and pausing, plus the ability to skip to any part of the recorded media programs without having to rewind or fast forward the data stream on the media player 130. In one embodiment, the player module 330 may play the media program while the recorder module 316 is recording it or other media programs.

Overview of Methodology

Figure 4:
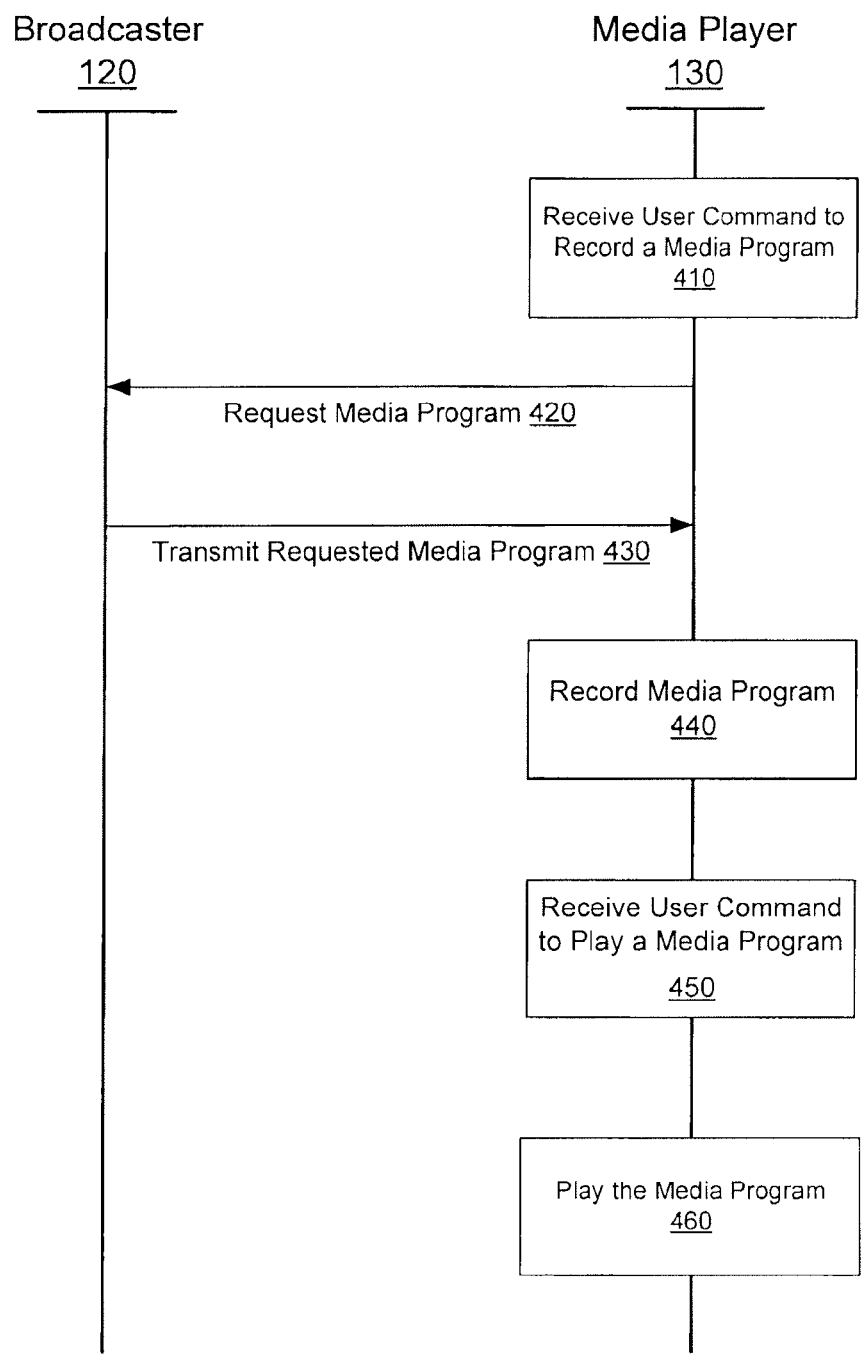
FIG. 4 is a flowchart of a process for recording a media program in a placeshifting system illustrated in the environment of FIG. 1, in accordance with an embodiment of the invention.

FIG. 4 is a flowchart of an exemplary process for recording a media program in a placeshifting system in accordance with one embodiment of the invention. This process may be implemented in software, hardware, or a combination of hardware and software.

The process illustrated in FIG. 4 starts with the media player 130 receives 410 a user command to record a media program. In one embodiment, the media player 130 presents schedule information of the media programs for the user to select. The media player 130 may receive the schedule information from an EPG service provider. The displayed schedule information may include title, channel, genre, rate (e.g., Motion Picture Association of America film rating), and broadcasting time of the media programs. The user may review the schedule information, conduct searches, and make a selection of a media program to be recorded on the media player 130.

Alternatively, the user can input the schedule information of the media program, such as the time and channel into the media player 130. The user can also provide other information such as priority and video quality of the recording. For example, the user can instruct the media player 130 to notify the user as soon as the identified media program is ready to view. As another example, the user can instruct the media player 130 to record an identified video program in high quality so that the user can play the video program in a HDTV. The user can make the selection and/or input using input devices such as a keyboard and a touch-sensitive screen of the media player 130.

In another embodiment, the user can input the user command via a different interface such as a webpage on a different device such as a computer connected to a network. The web server hosting the webpage can transmit the user command to the media player 130 through the network 140.

The media player 130 requests 420 the broadcaster 120 for the identified media program. The media player 130 generates a set of commands based on the schedule information of the identified media program and the user's inputs. The set of commands instruct the broadcaster 120 to receive (or retrieve) the identified media program, convert the media program to a format acceptable by the media player 130 (or other device(s) identified by the user), and transmit the converted program to the media player 130. In one embodiment, the media player 130 transmits the set of commands to the broadcaster 120 when the identified media program is scheduled to be transmitted by the media source 110, requesting the broadcaster 120 to start receiving the media program from the media source, digitize, transcode, and/or transrate the media program if necessary, and transmit the content of the media program to the media player 130 in a data stream. In another embodiment, the set of commands may request the broadcaster 120 to request the media source 110 to switch to the right channel so that the media source 110 receives and transmits the identified media program to the broadcaster 120.

The broadcaster 120 transmits 430 the identified media program to the media player 130 in a data stream. The media player 130 receives the data stream and records 440 the media program in a local storage device (e.g. the storage device 260). Depending on how the PVR module 310 is distributed (e.g., between the broadcaster 120 and the media player 130) and configured, the media program may be recorded in the broadcaster 120, the media player 130, or some other devices accessible through the network 140.

As is described in greater detail below, the broadcaster 120 may transmit the media program to the media player 130 as it receives the program from the media source 110. Alternatively, the broadcaster 120 may transmit the media program over time, thereby minimizing the impact on other operations of the media player 130. For example, the remote device 200 may be a smart phone, and the user may use the phone to make phone calls while the media player residing on the phone is receiving and recording the media program in the background. When there are interruptions in the transmission of the media program (e.g., lost cellular network connectivity), the broadcaster 120 may subsequently resume the transmission from where the previously interrupted transmission left off. In one embodiment, the media player may receive the data stream from an intermediate device (e.g., an on-network storage device) instead of the placeshifting device.

The media player 130 may present a notice to the user when the selected media program is recorded and/or ready for viewing. For example, the media player may generate and display a message identifying the media program and indicating its status (e.g., "the latest episode of 24 has just been received and is ready for viewing"). The user may thereafter decide to play the media program offline. As another example, the media player 130 may populate a listing of the recorded media programs available to the user, thereby allowing the user to browse the list of recorded programs and select one for enjoying.

The media player 130 receives 450 a user command to play a recorded media program and plays 460 the recorded media program. In one embodiment, the user selects a media program from a list of recorded programs. In another embodiment, the user can select to play a media program while it is recorded by the media player 130.

Transmission of Media Content

Media programs may be transmitted using different communication protocols (or network protocols) and/or networks. The broadcaster 120 and the media player 130 may support multiple communication protocols (e.g., Ethernet, WiMAX, WAN, Wi-Fi, and Bluetooth) and may communicate through multiple networks. The broadcaster 120 may transmit media programs using one or more communication protocols and/or networks.

In one embodiment, the media player 130 may send commands to the broadcaster 120, instructing it to use a particular communication protocol and/or network. Therefore, users of the media player 130 may set rules indicating their preferences among the communication protocols and/or networks. For example, a user may set a rule instructing the broadcaster 120 to use Ethernet, not Wi-Fi, to transmit media programs when both communication protocols are available. Users may also set restrictions for a communication protocol and/or network. For example, a user may prohibit the broadcaster 120 from transmitting media programs using a cellular network between 6 AM and 9 PM. Users may also specify a particular communication protocol for the transmission. For example, a user may set a low priority for a media program, requiring the broadcaster 120 to transmit the media program to a cellular phone overnight during non-peak hours so that the media program is available to the user for offline viewing on the cellular phone the following day.

The media player 130 may receive and record media programs in the background (i.e., while actively conducting other operations or tasks). For example, depending on the capability of the remote device 200 executing the media player 130, a user may use the remote device 200 to make phone calls, to send and/or receive emails or short messages, to browse the Internet, or to listen to music while the media player 130 is receiving and recording media programs from the broadcaster 120. In one embodiment, the connection manager module 314 adjusts the transmission of the media programs so that the other tasks are not affected (or affected minimally) by the transmission and recording. For example, when detecting that the user is initiating a phone call, the connection manager module 314 may temporarily halt (or suspend) the transmission, switch the transmission from using the cellular network to using another network, or decrease the transmission rate. As a result, the media program transmission and recording may be accomplished over time and not interfere with other operations of the remote device 200 and/or the media player 130.

In one embodiment, the broadcaster 120 may record (or cache) a media program (or a portion thereof) temporarily in a local (built-in or removable) storage after the transmission of the media program has been interrupted. The transmission may be interrupted (e.g., the network 140 may become temporarily unavailable) or slowed down (e.g., the media player 130 and/or the device 200 executing the media player 130 may be busy performing other tasks). Therefore, the broadcaster 120 may record the media program (or a portion thereof) received from the media source no in local storage to prevent it from being lost. Once a connection between the broadcaster 120 and the media player 130 is reestablished, the transmission of the media program can resume, taking into consideration the point at which the previously interrupted transmission left off.

As explained above with respect to FIGS. 3 and 4, depending on how the PVR module 310 is distributed and configured, the media program may be recorded by the broadcaster 120 in a local storage or an intermediate device (e.g., an on-network storage device such as a personal computer, a network access server, or a storage area network). The intermediate device may provide a PVR functionality to the media player 130. When a user wants to access the media programs from the media player 130, the broadcaster 120 may act as an arbiter between the media player 130 and the intermediate device by retrieving the media programs from the intermediate device and transcoding and/or trans-rating the content if necessary before repackaging and streaming it to the media player 130. Alternatively, the media player 130 may access the intermediate device directly. For example, the broadcaster 120 may be instructed to transmit media programs to a laptop computer (the intermediate device). The media player 130 may subsequently (or concurrently) retrieve the media programs from the laptop computer through a local network (e.g., Bluetooth).

SUMMARY

One of skill in the art will recognize that the method described above can be used in a number of circumstances or applications. For example, it can be used to provide time-shifting functionality on a placeshifting system to record audio and/or video programs.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system to placeshift video content to a remote device via a network, the system comprising:
    a receiver configured to receive the video content;
    a recorder configured to record at least a portion of the video content received via the receiver in storage, wherein the recorder is responsive to first instructions received via the network from the remote device that identify the recorded portion of the video content; and
    a placeshifter that transmits, responsive to second instructions received from the remote device via the network, the recorded portion of the video content to the remote device via the network for playback of the recorded portion of the video content on the remote device.

2. The system of claim 1 wherein the media receiver receives the video content as broadcast television content.

3. The system of claim 1 wherein the receiver receives the video content via a source on the network.

4. The system of claim 1 wherein the receiver is a media source that receives television content from a storage medium.

5. The system of claim 1 wherein the storage is located at the system.

6. The system of claim 1 wherein the storage is remotely located from the system.

7. The system of claim 1 wherein the video content is received at the media receiver in a television broadcast format.

8. The system of claim 7 wherein the video content is stored in the storage using the television broadcast format.

9. The system of claim 8 wherein the placeshifter is configured to encode the recorded portion of the video content in a format that is compatible with the network.

10. The system of claim 8 wherein the placeshifter is configured to transcode the recorded portion of the video content from the television broadcast format to a video streaming format that is compatible with transmission of the video content on the network as a video stream for playback on the remote device.

11. The system of claim 1 wherein the first instructions are responsive to a schedule of programming information presented by the remote device.

12. The system of claim 11, wherein the schedule of programming information is provided from a web server communicating on the network.

13. The system of claim 1, wherein the receiver is media source that is controlled by the placeshifter to obtain the portion of the video content that is identified in the first instructions.

14. A method executable by a placeshifting device to allow a user to record media programs from locations that are physically remote from a source of the media programs, the method comprising:
    receiving first instructions from a remote device via a network at the placeshifting device, wherein the first instructions identify a media program to be recorded;
    when the identified media program is scheduled to play, directing a media recording device to receive and store the identified media program; and
    in response to subsequent instructions from the remote device via the network, to transmit the stored media program to the remote device via the network for playback of the stored media program on the remote device.

15. The method of claim 14 comprising converting the stored media program from a storage format to a video streaming format that is compatible with delivery of the stored media program to the remote device via the network prior for playback.

16. The method of claim 15 wherein the directing comprises controlling a media source that receives broadcast television programming to thereby receive the identified media program as part of the broadcast television programming, wherein the storage format is a broadcast television format, and wherein the converting comprises converting the stored media program from the broadcast television format to the video streaming format.

17. A method executable by a device, the method comprising:
    receiving a user input that indicates a particular media program to be recorded at a later time;
    responsive to the first user input, providing a first instruction to a placeshifting device via a network to thereby direct the placeshifting device to record the particular media program at the later time;
    after the later time has passed, receiving a second user input directing that the particular media program be presented for playback;
    responsive to the second user input, providing a second instruction to the placeshifting device via the network to thereby direct the placeshifting device to obtain the particular media program and to provide the particular media program as a video stream for playback;
    receiving the video stream containing the particular media program from the placeshifting device via the network; and
    outputting the media stream for playback to the user.

18. The method of claim 17 further comprising, prior to receiving the user input that indicates the particular program, presenting a schedule of television programs to the user.

19. The method of claim 18 further comprising receiving the schedule of programs via the network.

20. The method of claim 19 wherein the first instruction comprises scheduling information about the particular program that is obtained from the schedule of programs.

* * * * *